(12) United States Patent
Fuldseth et al.

(10) Patent No.: US 6,968,388 B1
(45) Date of Patent: Nov. 22, 2005

(54) METHODS IN TRANSMISSION OF FILES IN A DATA COMMUNICATION NETWORK

(75) Inventors: Arild Fuldseth, Oslo (NO); John Markus Lervik, Asker (NO); Rolf Michelsen, Trondheim (NO); Nils-Johan Pedersen, Oslo (NO); Geirr I. Leistad, Sandvika (NO)

(73) Assignee: FileFlow AS, Oslo (NO)

( * ) Notice: Subject to any disclaimer, the term of this patent is extended or adjusted under 35 U.S.C. 154(b) by 0 days.

(21) Appl. No.: 09/674,969

(22) PCT Filed: Mar. 21, 2000

(86) PCT No.: PCT/NO00/00098

§ 371 (c)(1),
(2), (4) Date: Nov. 7, 2000

(87) PCT Pub. No.: WO00/57280

PCT Pub. Date: Sep. 28, 2000

(30) Foreign Application Priority Data

Mar. 22, 1999 (NO) .................................. 19991371

(51) Int. Cl.[7] ............................................. G06F 15/16
(52) U.S. Cl. ...................... 709/232; 709/201; 709/203; 709/217; 709/218; 709/247
(58) Field of Search ............................... 709/201, 203, 709/217, 218, 232, 247

(56) References Cited

U.S. PATENT DOCUMENTS 5,270,805 A    12/1993  Abe et al.
5,694,546 A    12/1997  Reisman

FOREIGN PATENT DOCUMENTS

WO    WO 98/44402    10/1998

OTHER PUBLICATIONS

Fraase, Michael, "Compression pros deliver telecon with SITcomm 1.0," *Macweek*, 8(1994):2, 2 pages.

*Primary Examiner*—Nabil El-Hady
(74) *Attorney, Agent, or Firm*—Brinks Hofer Gilson & Lione

(57) ABSTRACT

In methods in the transmission in a data communications network of arbitrarily formatted files between a sender (1) which represents an information provider and one/or more receivers (8) which represent users, a network server (5) is used in the transmission, the transmission itself taking place substantially transparent to both sender (1) and receiver (8). Before the transmission, a file which shall be transmitted is compression-coded, whereafter it is transmitted packet-divided via the server (5) to the receiver (8). In the transmission an already compression-coded file is subjected to a processing specific for one or more users and/or one or more specific application either in the server (5) or in the receiver (8) or both, without any effects on the transmission as such. Software used for the processing can be stored either at the sender (1), server (5) or receiver (8) and possibly downloaded automatically to the processing location. The particular operational and decision steps in the method are preferably realized in consecutive and approximately simultaneous and/or interfoliated steps.

16 Claims, 7 Drawing Sheets

METHODS IN TRANSMISSION OF FILES IN A DATA COMMUNICATION NETWORK

Applicants claim, under 35 U.S.C. § 119, the benefit of priority of the filing date of Mar. 22, 1999 of a Norwegian patent application Serial Number 19991371, filed on the aforementioned date.

FIELD OF THE INVENTION

The invention concerns methods in transmission in a data communications network, particularly Internet, of arbitrarily formatted files comprising one or more different data types, between a sender comprising a data-processing device connected to the data communications network, wherein the sender represents an information provider, and one or more receivers with respective data-processing devices connected with the data communications network, wherein each receiver represents a user, wherein transmission takes place via a dedicated server provided in or assigned to the data communications network, wherein files which shall be transmitted are stored in a database at the sender or in a database accessible from the sender and which for the transmission that substantially takes place transparently for both sender and receiver, are downloaded to the data-processing device of the sender.

BACKGROUND OF THE INVENTION

The need for fast, effective and safe transmission of files for application purposes is rapidly increasing. Particularly this is the case in the media industry where it is desirable with transmission of large files composed of different data types, including image information which is very capacity-demanding. Most of the information which is used in the media industry is present digitalized and transmitted in digital form and even though this can take place via existing broadband communications networks, the transmission of source information representing large data volumes, typically several Gbytes, yet becomes an expensive and for the user time-demanding process. Beyond all it is hence desirable to save time and costs in the transmission as well as making the transmission process more simple and efficient, something which will offer an end user great advantages compared with present file transmission systems. In a public data communications network such as Internet, the traffic has only been increasing all the time, something which makes the transmission of large data volumes and large files on Internet both time-consuming and cost-demanding. For large data volumes or extensive documents it hence may be an alternative to make use of courier services or file transmission on dedicated ISDN lines. Even though such measures guarantee a safe transmission, they are yet linked with substantial costs and the use of courier services may in a large number of cases be unsuitable due to the time factor.

In connection with transmission of files data processing the files in connection with a transmission is well-known. Data processing of this kind can typically consist of various forms of compression coding in order to reduce the data volume which shall be transmitted, or measures in order to protect the data which are transmitted against copying. In international published patent publication WO98/44402 there is thus disclosed a method for copying protection of data which are downloaded from a server, typically via World Wide Web, to a client in order to be presented to a user. The transmitted and downloaded data are protected cryptographically by encryption and hashing. The processing to this end may then take place in a network server before transmission on the World Wide Web. Further there is in a paper by Michael Fraase, "Compression pros deliver telecom with SITcom 1.0: Aladdin app offers transparent connection and compression" (MacWEEK, vol. 8, no. 2, 10. Jan. 1994, page 43(2)) disclosed a telecommunication software which automatically can compress files during transmission using the so-called "Stuffit" tool from Aladdin Systems Inc. The users can use this software which is called "SITcomm" for automatically converting files or folder hierarchies to "Stuffit" archives before uploading or for automatically expanding the archives as they are downloaded. SITcomm can also use a so-called toolbox for implementing all connections, file transmissions and emulations.

From U.S. Pat. No. 5,270,805 (Abe et al., assigned to Canon) there is additionally known a data-communication device which generate data as respectively character data and colour image data, these data being divided between respective block areas. The block area for the image data can further be divided into further block areas in correspondence with the image characteristics of the image data. In each case the data transmission takes place blockwise and by means of a conversion device it is determined whether a function is present in the receiver device and the transmitted data in the block areas are converted according to this. This may then imply that if the receiver has no possibilities of processing a colour image, the colour image data will be converted to data which can be processed by the receiver.

BRIEF SUMMARY OF THE INVENTION

In many cases data is transmitted in files with a specific processing at the receiver in mind, for different applications, and advantageously a processing of this kind which basically has no connection to the transmission process as such could take place in connection therewith.

The object of the present invention is thus to provide methods which make a combined transmission and a non-transmission-related processing of data in files on public communications networks, Internet more efficient.

It is particularly the object that a transmission of files with accompanying specific processing shall take place with regard to a possible transmission-specific processing of the files and see to it that the transmission of files between a sender and one or more receivers with connected specific processing for a user and user-related applications is realized with fast and secure transactions between the parties.

It is also an object of the invention that large files shall be transmitted anywhere in the world and then by combining the transmission with a specific processing, without transmission and processing requiring unnecessary large data resources at the sender and receiver. The transmission and specific processing shall then take place substantially in transparency both for the sender and receiver, such that they can exploit their data resources for other tasks while the transmission itself takes place.

The above-mentioned objects and advantages are realized according to the invention with a method which is characterized by processing a file specifically for one or more users and/or one or more applications under determined conditions, the specific processing taking place consecutively in a data-processing device of the server during the transmission and/or consecutively in the data-processing device of the receiver as the file is received and/or in the data-processing device of the receiver after the file has been received, and performing the processing with software which is stored in one or more of the following: the sender, the server or the receiver, and as required is transmitted before or in phase with the processing to an actual processing location.

The above-mentioned method comprises advantageously consecutive or approximately simultaneous and/or interfoliated realized steps for a) compression-coding the file which shall be transmitted with a proprietary data compression procedure or a general loss-free data compression procedure,
b) dividing the compression-coded file in packets,
c) transmitting the packet-divided compression-coded file to the dedicated server together with receiver addresses,
d) providing the packets with receiver address, and
e) transmitting the compression-coded file to one or more receivers according to the receiver addresses of the packets, as well as a further step, for
f) decoding the received file at the receiver according to the data-compression procedure or procedures already used for the compression coding.

The above-mentioned objects and advantages are additionally realized according to the invention with a method which comprises consecutive or approximately simultaneous and/or interfoliated realized steps for a) compression-coding the file which shall be transmitted with a proprietary data compression procedure or a general loss-free data compression procedure,
b) dividing the compression-coded file in packets,
c) transmitting the packet-divided compression-coded file to the dedicated server together with receiver addresses,
d) providing the packets with receiver address, and
e) transmitting the compression-coded file to one or more receivers according to the receiver addresses of the packets, and as well as further steps for
f) decoding the received file at the receiver according to the data-compression procedure or procedures already used for the compression coding, and
g) additionally processing the files specifically for one or more uses and/or for one or more applications under determined conditions, the specific processing taking place consecutively in the server during the transmission and/or consecutively in the data-processing device of the receiver as the file is received and/or in the data-processing device of the receiver after the file has been received, and performing the specific processing with software which is stored in one or more of the following: the sender, the server or the receiver and which as required is transmitted before or in phase with the processing to an actual processing location.

According to the invention it is advantageous that the sender simultaneously with the initialization of the transmission of during or after the transmission to the server sending a message to the receiver with a resource address and an access code and receiving a confirmation from the server when the latter has received the file and the confirmation from the receiver when the latter has received the file and downloaded it to its data-processing device.

Where the arbitrarily formatted file comprises one or more of the following data types, viz., image data, alphanumeric data, graphics data and fonts. It is according to the invention advantageous using the proprietary data compression procedure for compressing image data, and using the general loss-free compression procedure substantially for compression of alphanumeric data, graphics data and fonts.

According to the invention, it is advantageous storing the software for data compression coding and decoding in the server and downloading said software automatically, respectively, to the data-processing device of the sender for coding the file when the transmission is initialized and to the data-processing device of the receiver for decoding the file when it is received.

In that connection, packet-division preferably takes place dependent on the data type, such that each packet comprises a determined data type.

According to the invention, it is advantageous that the specific processing takes place in the server after a preceding decoding of the file in the server by means of the software for the data compression coding, the software for the processing either being stored at the sender and/or at the receiver and being transmitted to the data-processing device of the server when the processing shall take place, or beforehand stored in the data-processing device of the server, and after the specific processing again compression-coding the file with software stored in the server for transmission to the receiver, the server on the basis of the receiver address checking whether processing conditions are present.

In that connection are preferably the processing conditions assigned to a determined receiver address being stored in the server together with software for the processing and being accessed by the server on the basis of the receiver address, and preferably the specific processing is then performed on one or more determined data types such that only packets comprising the determined data type are decoded before the processing and coded anew after the processing has terminated.

According to the invention, it is advantageous that the decoding of the file at the receiver takes place consecutively as the file is received. In that connection the specific processing preferably takes place consecutively in the data-processing device of the receiver before and/or after the decoding of the file which is received, the software for the processing either being stored at the receiver and/or in the sender and/or in the server and being transmitted to the data-processing device or the receiver when processing shall take place or beforehand being stored in the data-processing device of the receiver.

It can, according to the invention, also be advantageous storing the file as it is received in the data-processing device or receiver, and then decoding the file by the receiver at a later suitably selected time. In that connection, the specific processing of the stored file can then preferably take place in the data-processing device of the receiver before and/or after the decoding of the file, the software for the processing either being stored at the sender and/or in the server and transmitted to the data-processing device of the receiver when, processing shall take place or beforehand entered in the data-processing device of the receiver.

According to the invention, the dedicated server is advantageously implemented on a general network server.

According to the invention are user names, receiver addresses, files and the given processing conditions assigned to user names or receiver addresses preferably stored temporarily or permanently in a data base provided in the server.

BRIEF DESCRIPTION OF THE DRAWINGS

The invention shall now be explained in more detail in connection with exemplary embodiments and with reference to the accompanying drawing, wherein.

DETAILED DESCRIPTION OF THE INVENTION

Figure 1:
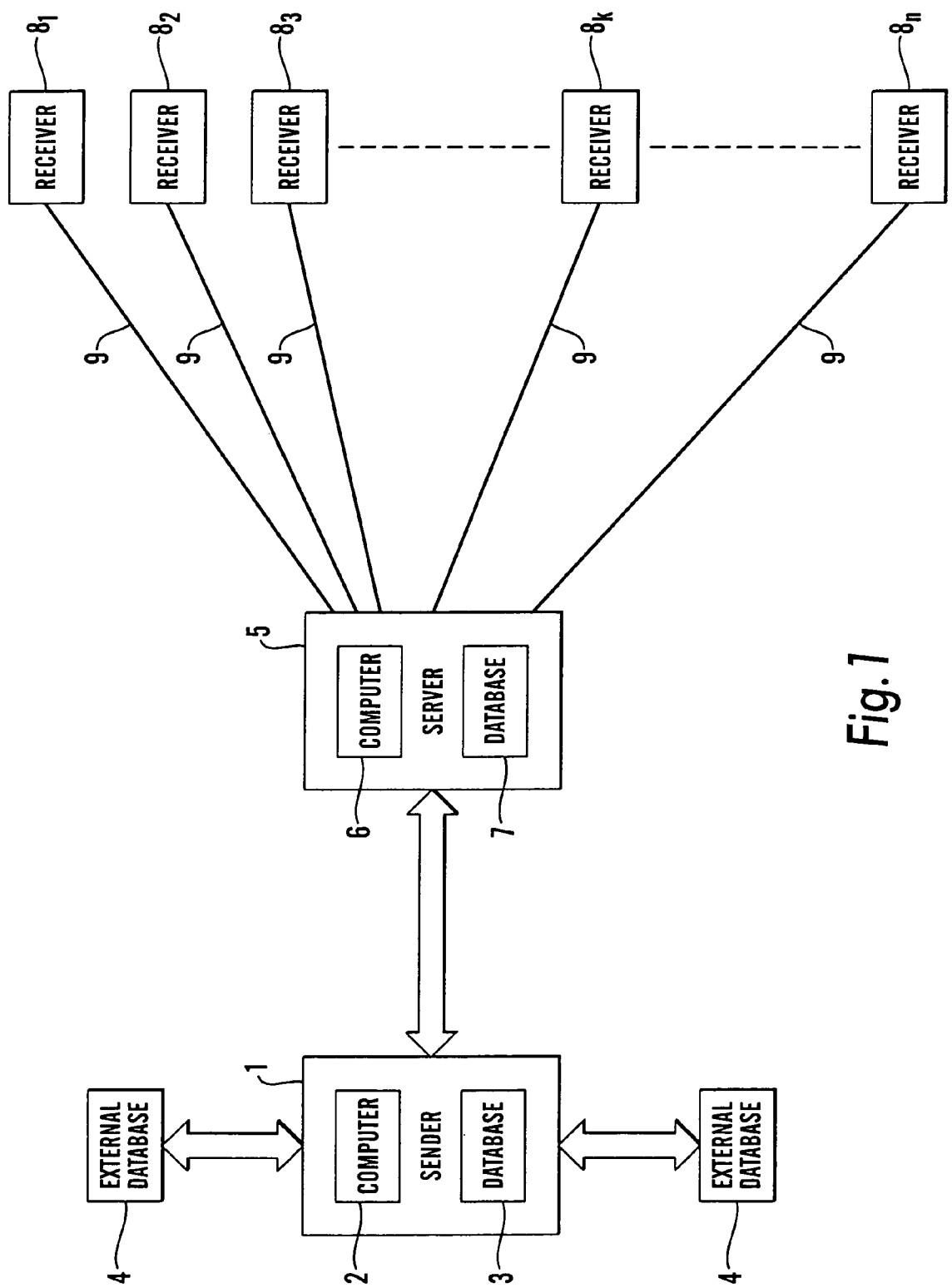
FIG. 1 shows a system layout for data transmission between a sender and several receivers in a public data communications network such as Internet.

FIG. 1 shows the system layout for file transmission in a public data communications network, Internet, such as known in the art. A number of information providers can be connected with the system and an information provider is here shown represented by the sender 1. The sender 1 comprises a data-processing device or computer 2 which well may be a personal computer and a database 3 connected with computer 2. In addition, the sender 1 can optionally also communicate with one or more external databases 4. These external databases 4 can be connected with a sender in a local network and stored on local data-processing devices which well may be the information provider's own. Alternatively, the external databases 4 can be stored at other information providers and then, be accessed by the sender 1 via the public data communications network. The sender 1 is connected with, and has at its disposal, a dedicated server 5 which can be a free-standing data-processing device with a computer 6 and a database 7 connected thereto. The server 5 can be accessed via local network and or the public data communications network and comprises in any case a not shown interface for such a public data communications network which then may be Internet. Alternatively, the server 5 could also be implemented on the sender's own network server and the required data processing takes place on the sender's own computer. As a dedicated server in a data communications network, the server 5 can be a shared resource for several information providers and, consequently, be accessed from several senders 1. In regard of software, the server is basically realized with two modules, one for reception of files and one for transmission of files to receivers. Additionally, the server can comprise several modules, for processing of data, message switching, etc. The server's software will normally be stored in the database 7 assigned to the server. However, this database can, in its turn, be a shared resource for several information providers or form a part of the sender's own database 3.

The server 5 can, via the public data communications network, communicate with arbitrary number of receivers $8_1, 8_2, \ldots 8_k, \ldots 8_n$. This communication then takes place on the public available data communications network, Internet, via lines 9. The receivers are users of information and receive, on request, information transmitted from the information provider or the sender 1 in the form of files. The received files can, after downloading to the receiver 8, be processed on a data-processing device at the receiver, stored in a local data memory at the receiver and be utilized for a user-specific application at a time appropriate for the user.

It is a part of the object of the invention that the file transmission proper and all the operations which in this connection as executed by the server 5 take place substantially transparent to the sender as well as the receivers 8. This implies, in practice, that at least while the file transmission takes place, the data-processing devices of both the sender and the receivers or computer could be used for other tasks, as the file transmission operation as such shall not in any considerable degree load the mentioned computers.

A preferred embodiment, according to the invention, shall now be discussed with reference to FIG. 2 which renders a flow diagram showing the separate steps of the method. In this connection, it shall be remarked that all references in the flow diagram to specific processing points to a user-specific or application-specific processing which has no consequences for the file transmission as such.

Figure 2:
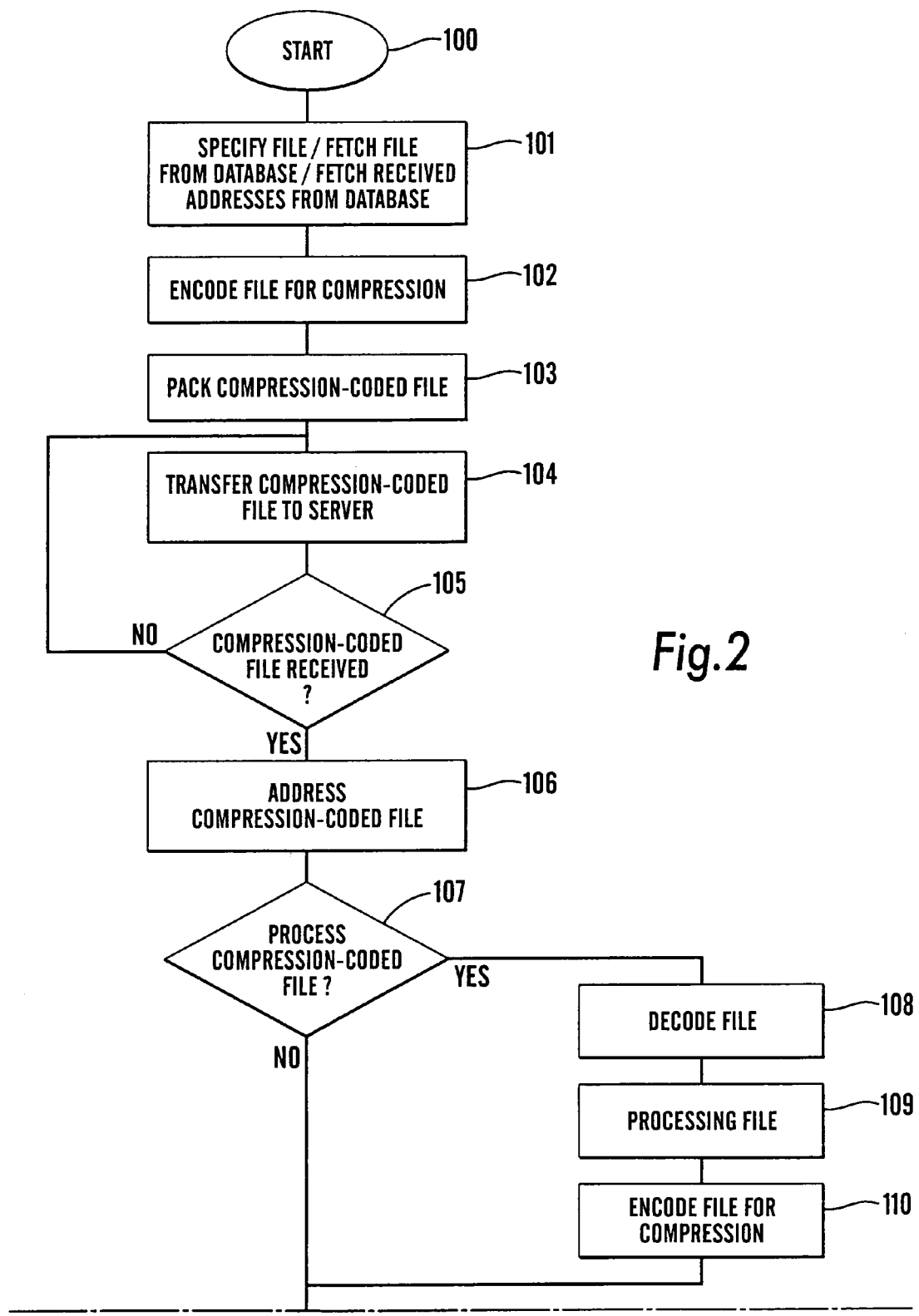
FIG. 2 is a flow diagram for a preferred embodiment of the method according to the invention, FIG. 3. is a flow diagram for a first variant of the embodiment in FIG. 2, and FIG. 4. is a flow diagram for a second variant of the embodiment in FIG. 2.
Figure 2:
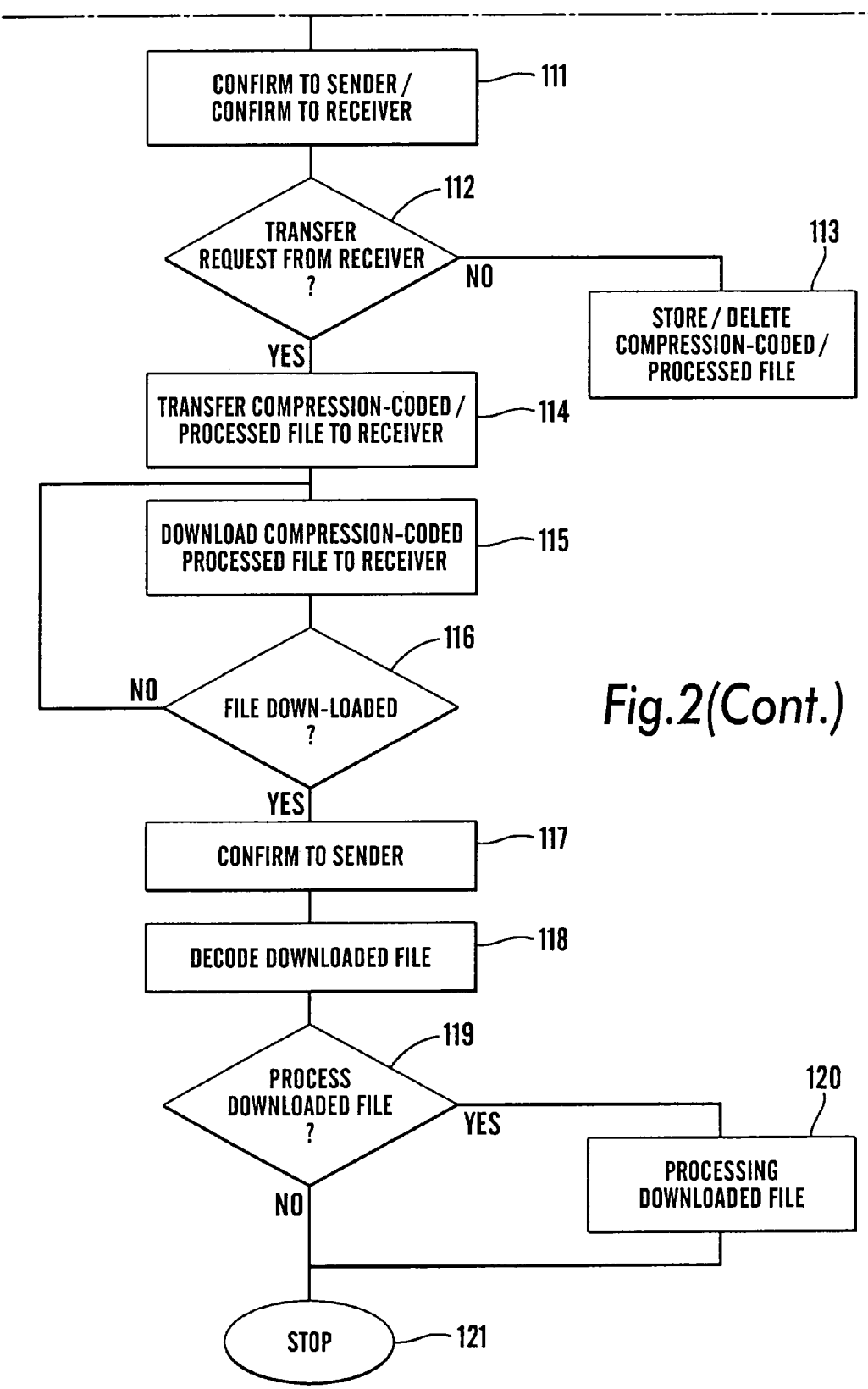

The embodiment of the method according to the invention is initialized at the start step 100 on the sender's 1 computer 2 as shown in FIG. 2. With the sender, it is to be understood that an information provider serves a number of clients which are the receivers or users of the information. In step 101, the files which shall be transmitted are specified and fetched from the database 3 of the sender 1 or from databases 4 which can be accessed by the sender. These databases can be connected with the sender 1 in a local network or be accessed via the public data communications network which in the following will be supposed to be identical with Internet and denoted as such. It is to be understood that the file which shall be transmitted may consist of different types of source information which may well be located in several databases. Before the transmission all source information is in such a case collected in the file to be transmitted. The sender 1 also fetches receiver addresses, i.e. addresses to clients or users, preferably stored in the sender's own database 3. It is to be understood that files and documents collected may be formatted arbitrarily. They may be compression-coded beforehand with some appropriate compression procedure such as MPEG for video or films or JPEG for stills. The files can consist of a number of different data types as they do not need to consist of image information which, in this case, shall be understood as video images, film images or still images, but may, in addition also comprise usual alphanumeric information, graphics information and possibly fonts. The latter will be relevant where alphanumeric and graphics information in the files at the users will be applied in media enterprises, the graphic industries. In step 102 the collected files now are compression-coded, as either a proprietary compression procedure or a particular loss-free data compression procedure is used. The proprietary data compression procedure can be a particular compression procedure for image information, possibly with an adaptation for stills or video. This proprietary compression procedure is developed by Fast Search & Transfer ASA, which has assigned the rights of use to the applicant. It will be relevant using it for those parts of the file which consist of image information. Other data types in the collected files as alphanumeric and graphics information can be compressed with a general loss-free procedure, such loss-free compression procedures being well-known to persons skilled in the art and hence not discussed in further details herein. As the collected file or parts thereof can be an arbitrarily formatted file, the file or parts thereof can as mentioned already be subjected to a compression procedure. A repeated data compression of image information in the form of video images which already have been subjected to a compression of the MPEG type will with the applicant's proprietary compression procedure which has a higher compression factor than MPEG be further compressed. In other parts of the file which beforehand may have been subjected to a loss-free compression procedure, the general loss-free compression need not effect a further compression of these parts. In any case the compression coding in step 102 executed on the sender's own computer 2 which thereafter divides the collected compression-coded files in packets, such that each separate packet preferably contains a determined data type and at the sender has been subjected to a particular form of compression coding.

It is to be understood that the software used in the compression coding can be stored on the sender's own data-processing device, but preferably it is stored in the server 5 and will, when the file transmission is initiated, automatically be transmitted to the sender 1 from the server 5.

In step 104, the packet-divided compression-coded file is now transmitted from the sender's 1 computer 2 to a server 5 which well may be the sender's own network server or a dedicated server and connected with a server via a dedicated line, a local network or a public data communications network such as Internet. The sender 1 will now in step 5 inquire of the server 5 whether the compression-coded file has been received and, if the answer is NO, the file transmission will continue until this is the case. If the answer is YES and the compression-coded file is completely received on the server 5, the file is now provided with receiver address in the server's 5 computer 6 in step 106. The receiver address will be downloaded from the sender 1 to the server 5 at the start of the transmission. The receiver address may, however, also be an identification code and the intention is in any case that the receiver address or the identification codes are used in a step 107 implemented on the server 5, wherein a decision is taken whether the compression-coded files shall be subjected to a specific processing in the server or not. If the answer is NO, a confirmation is sent in step 111 that the file has been received on the server 5 and, simultaneously, a confirmation is sent to the receiver 8, the confirmation comprising a message with a resource address (URL) and an access code, the latter a password for the user. In the present case, the resource address will, of course, be the address of the server.

The decision in step 107 takes place on the basis of the receiver address or the identification code with a table which for the relevant receiver address or identification code provides the server with the necessary processing instructions. If the answer in step 107 hence is YES, the file is decoded in step 108 and thereafter subjected to the required data processing, i.e., a specific processing in step 109. This processing can be user specific or application-specific and takes place with software which is stored in the data base 7 of the server 5 or which is transmitted to the database of the server, either on the basis of the receiver addresses when the file transmission starts or beforehand has been stored in the database 7 of the server 5 by the separate receiver. In this connection, it is to be understood that step 111 very well may be realized in another location in the transmission process such that the confirmation can effect the transmission of the required software for the processing from either the sender or receiver before the decision in step 107 concerning the processing is made. The processing which takes place in step 109 can be user-specific or application-specific, i.e., the file is processed user-specifically for one or more users or receivers or application-specifically for two or more users, such that the file is subjected to the same processing for one and the same application or one and the same application is implemented at more than one user. The processing will, as a rule, take place by packet switching be executed on packets which comprise image information and it is, of course, then evident that not all packets in the file need to be decoded before the processing. A typical example of processing which is performed can be the processing of image information with the intention of providing the image information with an optimum colour profile for the relevant user's applications. An example of a colour profile of this kind is the so-called ICC standard which stands for International Color Consortium which was established in 1993 by 8 industrial enterprises in order to provide a standardized architecture and standardized components for colour handling in image information. Digitalized colour image data will both before and after the compression coding typically be present as an RGB code. After image information has been decoded for processing, the RGB format is converted to a CMYK colour format with the use of the ICC colour profile. For the sake of that, this could also be done on the sender's computer 2, but preferably step 109 is realized as shown on the server's computer 6. In this connection, the ICC profile can be transmitted automatically to the server 5 from the sender 1 or from a receiver 8, but may also be prestored in the server. The ICC profile is, in any case, implemented in each case when the image information format after the decoding is converted from the RGB format to the CMYK colour format.

After completed processing in the server 5, the file is again compression coded in step 110 and a confirmation is submitted as mentioned above in step 111 in the form of a message to the sender and a confirmation in the form of a message to the receiver 8. Whether the confirmation of the receiver in step 111 as mentioned is submitted at an early stage in the process or immediately after step 107 or step 110, the server 5 in step 112 will receive a transmission request from one or more receivers 8 and, if the server in step 112 does not find such a transmission request for a receiver, an already compression-coded or processed file for the receiver can, in step 104, either be stored in the server 5 for later transmission to the receiver or be deleted. If the server 5, in step 112, on the contrary, finds that a transmission request from one or more receivers is present, the server 5 transmits the compression-coded and in case also processed files to the respective receivers 8 on the basis of the receiver addresses, as each packet is addressed and transmitted consecutively after step 107 as the packets are received on the server 5 or consecutively following step 110, in any case on the basis of the received transmission request such this is present at step 112. The transmission from the server 5 to the receiver 8 takes place in step 114 and the file is downloaded consecutively in step 115. In step 116, a decision is made whether the file is downloaded and, if the answer is NO, the downloading of a compression-coded and possibly processed file in step 115 continues until the downloading is completed and confirmed in step 116 with YES. Then the receiver 8 in step 117 sends a confirmation in the form of a message to the sender 1 that the file has been downloaded. After the file has been received and downloaded to the receiver's computer, the latter decodes the file in step 118.

Figure 3:
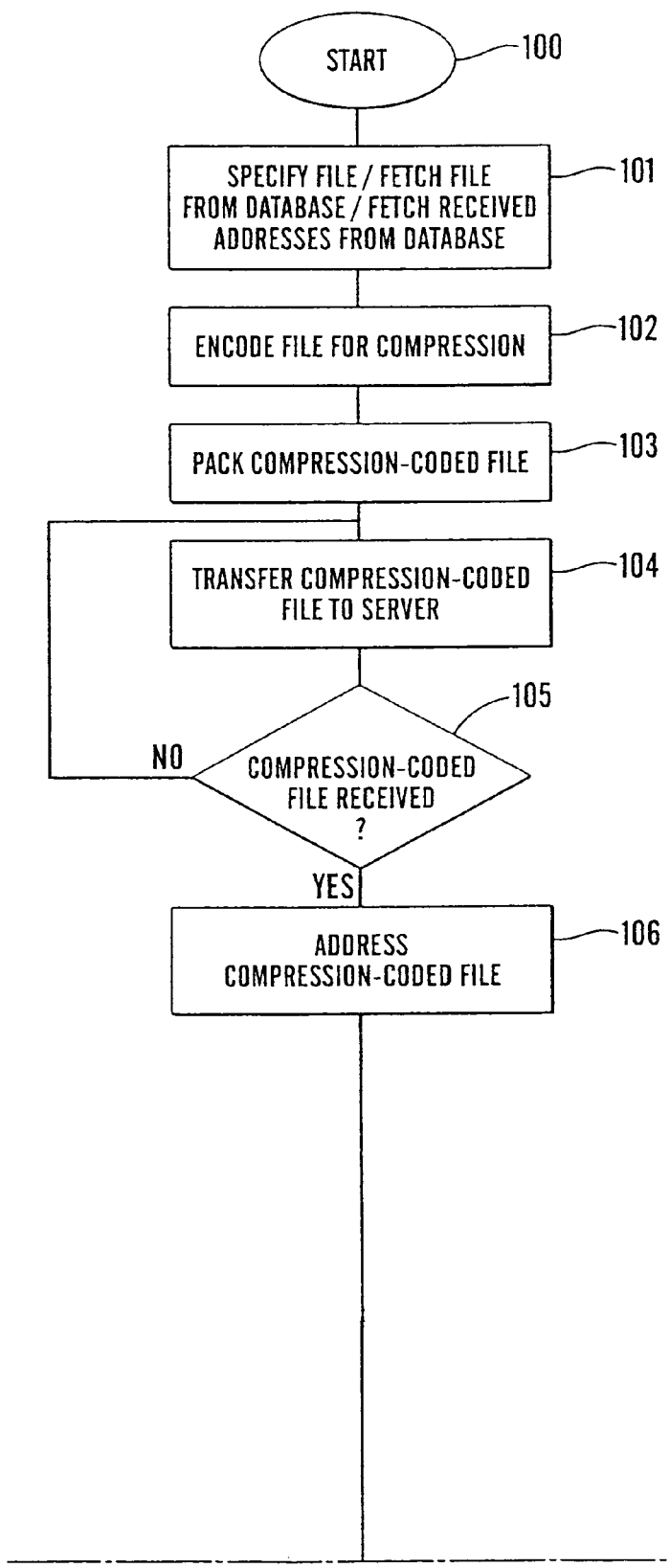
Figure 3:
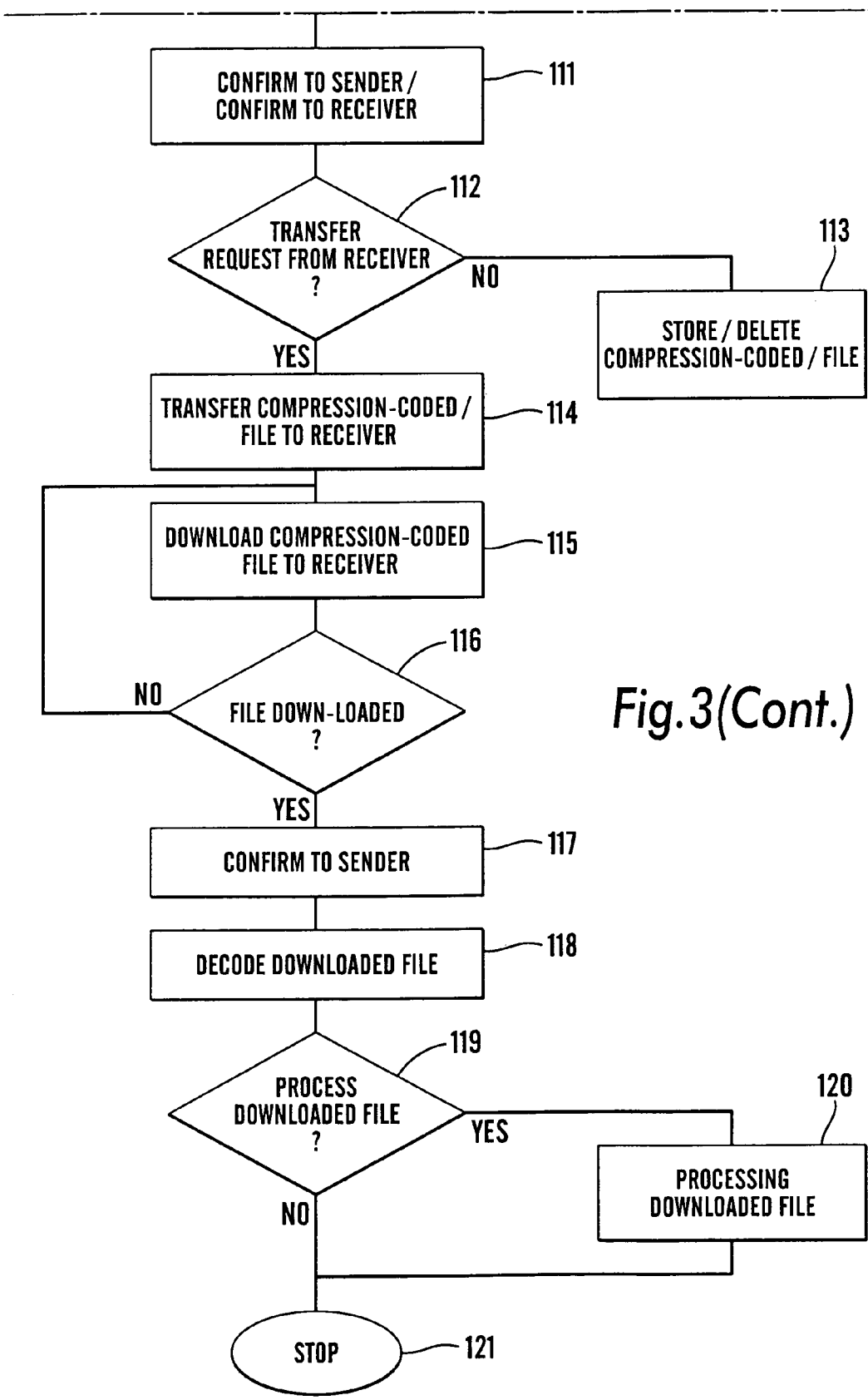

Advantageously, a specific processing also may take place on the receiver's 8 own computer and a decision about a processing of this kind is taken in step 119. If the answer is YES, the downloaded file is processed in step 120 and it is default that the processing can comprise a number of separate processing steps and be executed on different data types. Where the user or receiver 8 represents media industry or graphic industry, it may of course be topical to implement a suitable colour profile in connection with conversion from one colour format to another. There is also nothing against a file which already has been subjected to a processing on the server 5 in step 109 or after the decoding at the receiver 8 in step 118 being processed further and user-specifically by the receiver 8 in step 120 such that this alternative is evident from FIG. 2. Further, both the user-specific and application-specific processing can wholly take place on the receiver's own computer and without a preceding specific processing in step 109 in the server. This is shown in FIG. 3 which corresponds to the case where the answer in step 107 in FIG. 2 is always NO. Consequently, step 107 and the loop with the steps 108–110 have been deleted from FIG. 3 for clarity's sake, as specific processing now only takes place in step 120. If the answer in step 119 is NO, the transmission is finally complete and the entire process terminates in step 121 as shown both in FIG. 2 and FIG. 3.

It is also possible that certain forms of processing can be performed in the server 5 on a compression-coded file without a preceding decoding taking place. This alternative will, of course, be expressed by a processing condition, but is not shown in FIG. 2. In practice, this implies that steps 108 and 110 are deleted.

Figure 4:
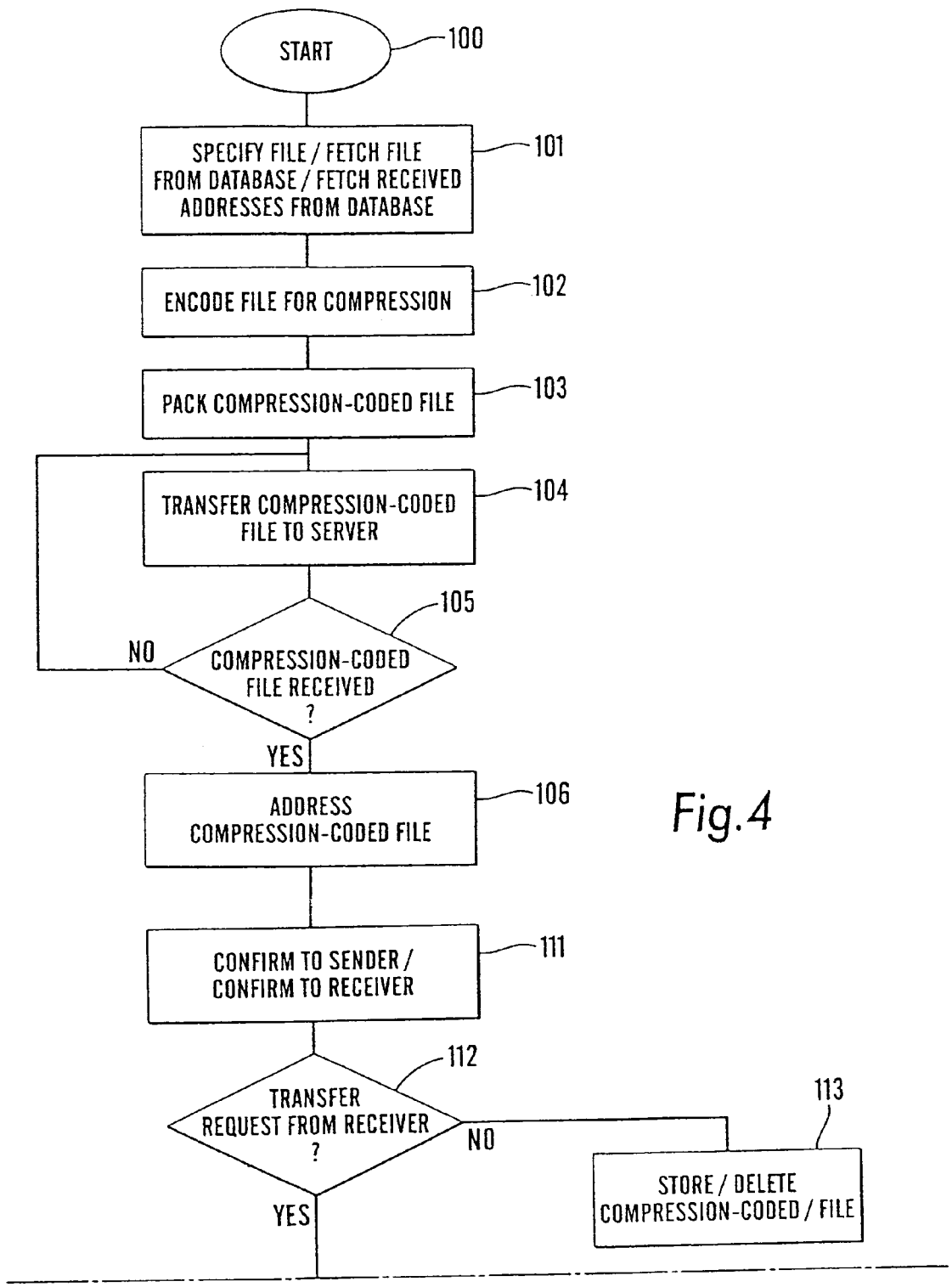
Figure 4:
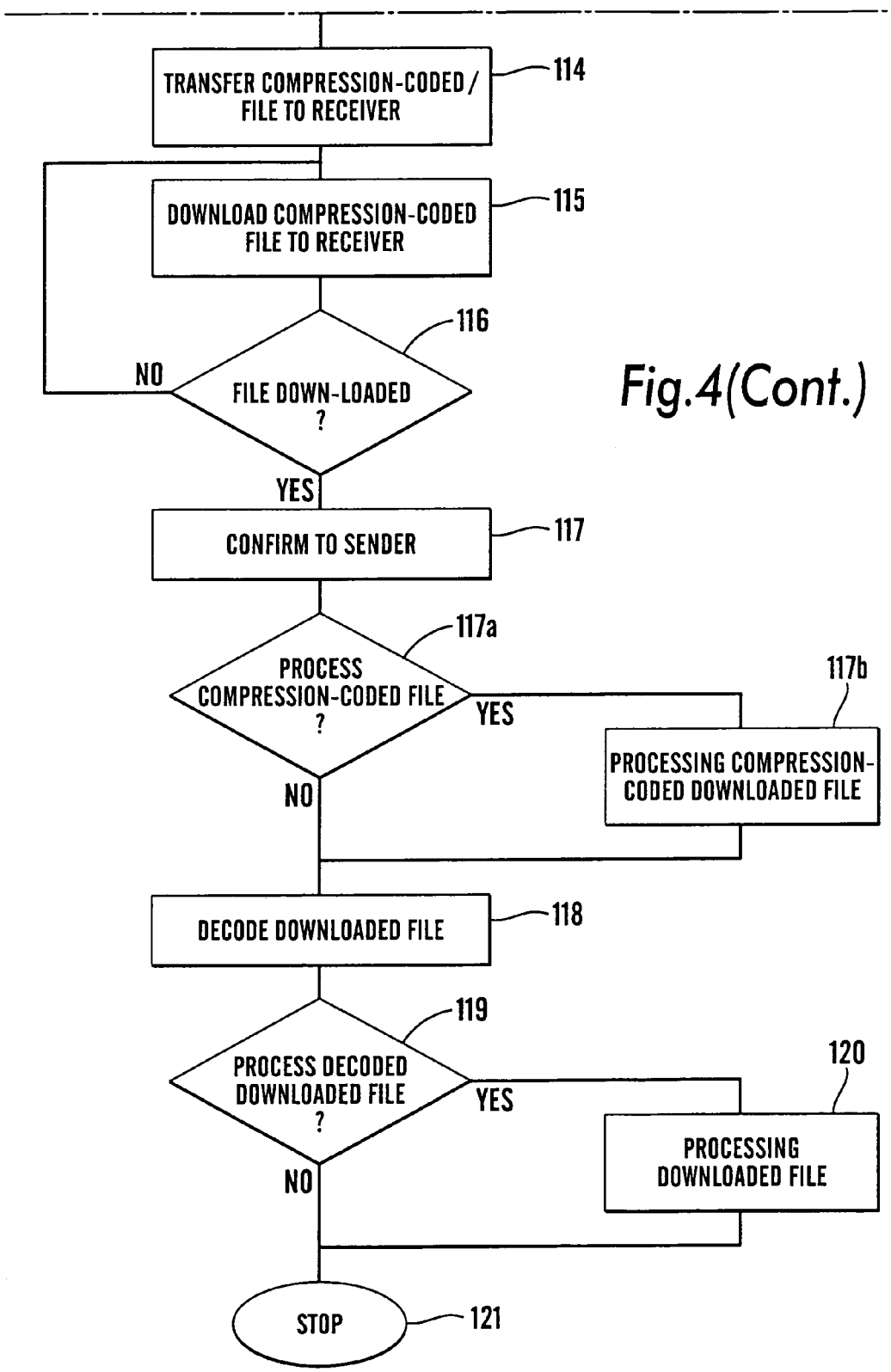

Optionally, a correspondingly specific processing of compression-coded files can take place in the receiver 8 without a preceding decoding. This is shown in FIG. 4, which is similar to FIG. 3, but comprises an additional decision in step 117a and a loop with an additional processing step 120. Processing on the basis of a decision in step 117a will take place in step 117b, whereafter the file is decoded in step 118 and optionally after a decision in step 119, once again is subjected to a specific processing in step 120.

According to the invention, the separate steps in the method are realized consecutively and approximately simultaneously such that a step does not need to be terminated before the next has begun, as the separate operational steps in practice are performed by packet-switching. This implies, in other words, that the first packets in the file already can be downloaded at the receiver 8, while compression coding and packing of the last parts of the files still take place in the sender 1. Further, it shall be understood that the succession of the separate steps may be different than shown in the flow chart in FIG. 2, which only schematically renders a preferred embodiment. In practice, the operational steps can be interfoliated, i.e., for instance, decoding and downloading of not-processed packets in step 115 in time may well precede the processing in step 109. Also, the steps for transmission of confirmations between the acting parties, i.e., the sender 1, the server 5 and the receiver 8, can be located differently in the sequence of steps. A confirmation to receiver 8 with resource address, file reference and password can, for instance, take place already before the transmission starts and then, of course, from the sender 1 to the receiver 8. Correspondingly, the server 5 can confirm the transmission with a message to the sender 1 immediately after in step 107. Yet it is regarded as most suitable that the confirmations are given in the form of messages from the server to the sender and receiver, respectively, after a possible processing in the server has been terminated. Further, a confirmation in step 111 will usually cause the server 5 to receive a transmission request from the receiver 8 at step 112, but a transmission request may well be entered beforehand on the basis of an already submitted message from the sender 1.

It is, of course, no requirement that the decoding of the file in step 118 takes place consecutively as the file is downloaded. The receiver 8 can choose to download the file without decoding and, thereafter, store the compression-coded and possibly already processed file on his own computer for a shorter or longer time period with regard to a later application. As the file already is compression-coded, the storage will require little space. The decoding of the stored file can then take place at a later time and be combined with a possible user-specific or application-specific processing on the receiver's own computer. Neither is it, of course, anything against performing the processing or parts thereof on the stored compression-coded file, i.e., before the decoding takes place, but, in most cases, the file will be processed in connection with the decoding and then, as this takes place, for an application requirement which shall be met on a suitable time for the receiver or user after the file has been transmitted or stored on the data-processing device of the user.

The method in file transmission, according to the present invention, also provides great flexibility with regard to storage and downloading of the required software for processing. As mentioned, the software for the compression coding, for instance, may be suitably stored at the server 5 and automatically be downloaded to the sender 1 when the transmission is initialized, but it can, of course, also be prestored at the sender. Software for the specific processing can correspondingly be stored at the sender 1 as well as the server 5 and/or the receiver 8, and transmission of software of this kind can be implemented automatically when a decision on processing is taken irrespective of whether it takes place at the sender, server or receiver.

The methods in transmission of files, according to the present invention, will be well suited for file transmission of text and images on Internet with applications in the media industry in regard. By systematically using the compression procedure based on Applicant's own data compression technology for image information, and commonly known as loss-free compression procedures for text and fonts, a file transmission with a particularly large capacity is obtained while the transmission costs are reduced. The applicant's own data compression technology is many times as effective as the known standards, such as JPEG and MPEG, with regard to compression speed, while the quality of the decoded information in regard of colour rendition and resolution is far better. For instance, large image files can in the present method, be compressed by more than 98% and transmitted via Internet anywhere in the world without causing an appreciably reduced image quality. The transmission additionally takes place very fast—as a rule the confirmation that a downloading has taken place will appear just as fast as it shall take to write the corresponding data to a common CD-ROM.

As mentioned, the methods, according to the present invention, shall be particularly well suited in the media industry. As more and more tasks in the media industry apply digitally-based information, this requires an effective file transmission. Simultaneously, the files can, in connection with the transmission, be subjected to a specific processing and this processing shall, regardless of where it takes place, similar to other procedures during the transmission, substantially take place in transparency both to sender and receiver. In the present method, the demand for lines with high bandwidth is eliminated by far as the specific processing does not affect the bandwidth requirement in the transmission, and owing to the use of the above-stated compression factor, it will be possible to obtain a virtual processing rate of the magnitude 10 Gbit/h on an ordinary ISDN line. If a transmission line with the fixed band-width of 2 Mbit/s is used, it will, with the method according to the present invention and under the same conditions, be achieved in a virtual transmission capacity of 360 Gbit/h even though the file in the transmission is subjected to a specific non-transmission-related processing. The virtual transmission capacity for a given line is, in other words, only dependent on the compression factor, but implies for the receiver or user when the transmission takes place with a compression factor of 50 which is very far from an upper limit of the applicant's own data compression technology, an essential improvement of the performance even when it is compared with the up to now used methods on Internet for data transmission without specific processing.

Finally, it is to be understood that the herein disclosed methods, according to the invention, shall not be incompatible with the corresponding specific processing in the sender according to predetermined criteria. The processing will then take place before the compression coding in step 102, and in the division in packets will not only the data type be taken in regard, but also the possible specific processing. A specific processing of this kind at the sender side will, however, as a rule be inexpedient due to the capacity requirements, but will according to the circumstances have no consequences for the other transmission and processing procedures as used in the methods according to the present invention.

What is claimed is:

1. A method in the transmission in a data communications network, particularly Internet, of arbitrarily formatted files comprising one or more different data types, between a sender comprising a data-processing device connected to the data communications network, wherein the sender represents an information provider, and one or more receivers with respective data-processing devices connected with the data communications network, wherein each receiver represents a user, wherein the transmission takes place via a dedicated server provided in or assigned to the data communications network, wherein files which shall be transmitted are stored in a database at the sender or in a database accessible from the sender and which, for the transmission that substantially takes place transparently for both sender and receiver, are downloaded to the data-processing device of the sender, and wherein the method comprises processing a file specifically for one or more users with user specific application software for one or more user specific applications under determined conditions, a specific processing with the user specific application software taking place consecutively in a data processing device of the server during the transmission and/or consecutively in the data-processing device of the receiver as the file is received and/or in the data-processing device of the receiver after the file has been received; and performing the specific processing with the user specific application software which is stored in one or more of the following: the sender, the server or the receiver, and, as required, is transmitted before or in phase with the processing to an actual processing location.

2. A method according to claim 1, comprising:
   compression-coding the file which shall be transmitted with a proprietary data compression procedure or a general loss-free data compression procedure,
   dividing the compression-coded file in packets,
   transmitting the packet-divided compression-coded file to the dedicated server together with receiver addresses,
   providing the packets with receiver address, and
   transmitting the compression-coded file to one or more receivers according to the receiver addresses of the packets, as well as a further step, for
   decoding the received file at the receiver according to the data compression procedure or procedures already used for the compression coding.

3. A method in transmission in a data communications network, particularly Internet, of arbitrarily formatted files comprising one or more different data types, between a sender comprising a data-processing device connected to the data communications network, wherein the sender represents an information provider, and one or more receivers with respective data-processing devices connected with the data communications network; wherein each receiver represents a user, wherein transmission takes place via a dedicated server provided in or assigned to the data communications network, wherein files which shall be transmitted are stored in a database at the sender or in a database accessible from the sender and which for the transmission that substantially takes place transparently for both sender and receiver, are downloaded to the data-processing device of the sender, and wherein the method comprises:
   compression-coding a file which shall be transmitted with a proprietary data compression procedure or a general loss-free data compression procedure,
   dividing the compression-coded file in packets,
   transmitting the packet-divided compression-coded file to the dedicated server together with receiver addresses,
   providing the packets with receiver address, and
   transmitting the compression-coded file to one or more receivers according to the receiver addresses of the packets, and as well as further step, for
   decoding the received file at the receiver according to the data compression procedure or procedures already used for the compression coding, and
   additionally processing the file specifically for one or more users with user specific application software for one or more user specific applications under determined conditions, a specific processing taking place with the user specific application software consecutively in a data-processing device of the server during the transmission and/or consecutively in the data-processing device of the receiver as the file is received and/or in the data-processing device of the receiver after the file has been received, and performing the specific processing with the user specific application software which is stored in one or more of the following: the sender, the server or the receiver and which, as required, is transmitted before or in phase with the processing to an actual processing location.

4. A method according to claim 3,
   wherein the sender simultaneously with the initialization of the transmission during or after the transmission to the server sending a message to the receiver with a resource address of the server and an access code of the server and receiving a confirmation from the server when the latter has received the file and a confirmation from the receiver when the latter has received the file and downloaded it to its data-processing device.

5. A method according to claim 3, wherein an arbitrarily formatted file comprises one or more of the following data types, image data, alphanumeric data, graphic data and fonts, wherein using the proprietary data compression procedure for compressing image data, and using the general loss-free compression procedure substantially for compression of alphanumeric data, graphics data and fonts.

6. A method according to claim 3, wherein storing software for data compression coding and decoding in the server and downloading said software automatically respectively to the data-processing device of the sender for coding the file when the transmission is initialized and to the data-processing device of the receiver for decoding the file when it is received.

7. A method according to claim 3, wherein the packet division taking place dependent on the data type, such that each packet comprises a determined data type.

8. A method according to claim 3, wherein the specific processing taking place in the server after a preceding decoding of the file in the server by of the software for the data compression coding, the software for the specific processing either being stored at the sender and/or at the receiver and being transmitted to the data-processing device of the server when the specific processing shall take place, or beforehand stored in the data-processing device of the server, and after the specific processing again compression-coding the file with software stored in the server for transmission to the receiver, the server on the basis of the receiver address checking whether processing conditions are present.

9. A method according to claim 8, wherein the processing conditions assigned to a determined receiver address being stored in the server together with software for the processing and being accessed by the server on the basis of the receiver address.

10. A method according to claim 8, wherein performing the specific processing on one or more determined data types such that only packets comprising the determined data type are decoded before the processing and coded anew after the processing has terminated.

11. A method according to claim 3, wherein the decoding of the file at the receiver taking place consecutively as the file is received.

12. A method according to claim 11, wherein the specific processing taking place consecutively in the data-processing device of the receiver before and/or after the decoding of the file which is received, the software for the processing either being stored at the receiver and/or in the sender and/or in the server and being transmitted to the data-processing device of the receiver when processing shall take place or beforehand being stored in the data-processing device of the receiver.

13. A method according to claim 3, wherein storing the file as it is received in the data-processing device of the receiver, and then decoding the file by the receiver at a later suitably selected time.

14. A method according to claim 13, wherein the specific processing of the stored file taking place in the data-processing device of the receiver before and/or after the decoding of the file, the software for the processing either being stored at the sender and/or in the server and transmitted to the data-processing device of the receiver when processing shall take place or beforehand entered in the data-processing device of the receiver.

15. A method according to claim 3, wherein the dedicated server being implemented on a general network server at the sender.

16. A method according to claim 3, wherein user names, receiver addresses, files and the given processing conditions assigned to user names or receiver addresses temporarily or permanently are stored in a database provided in the server.

* * * * *